Figure 1:
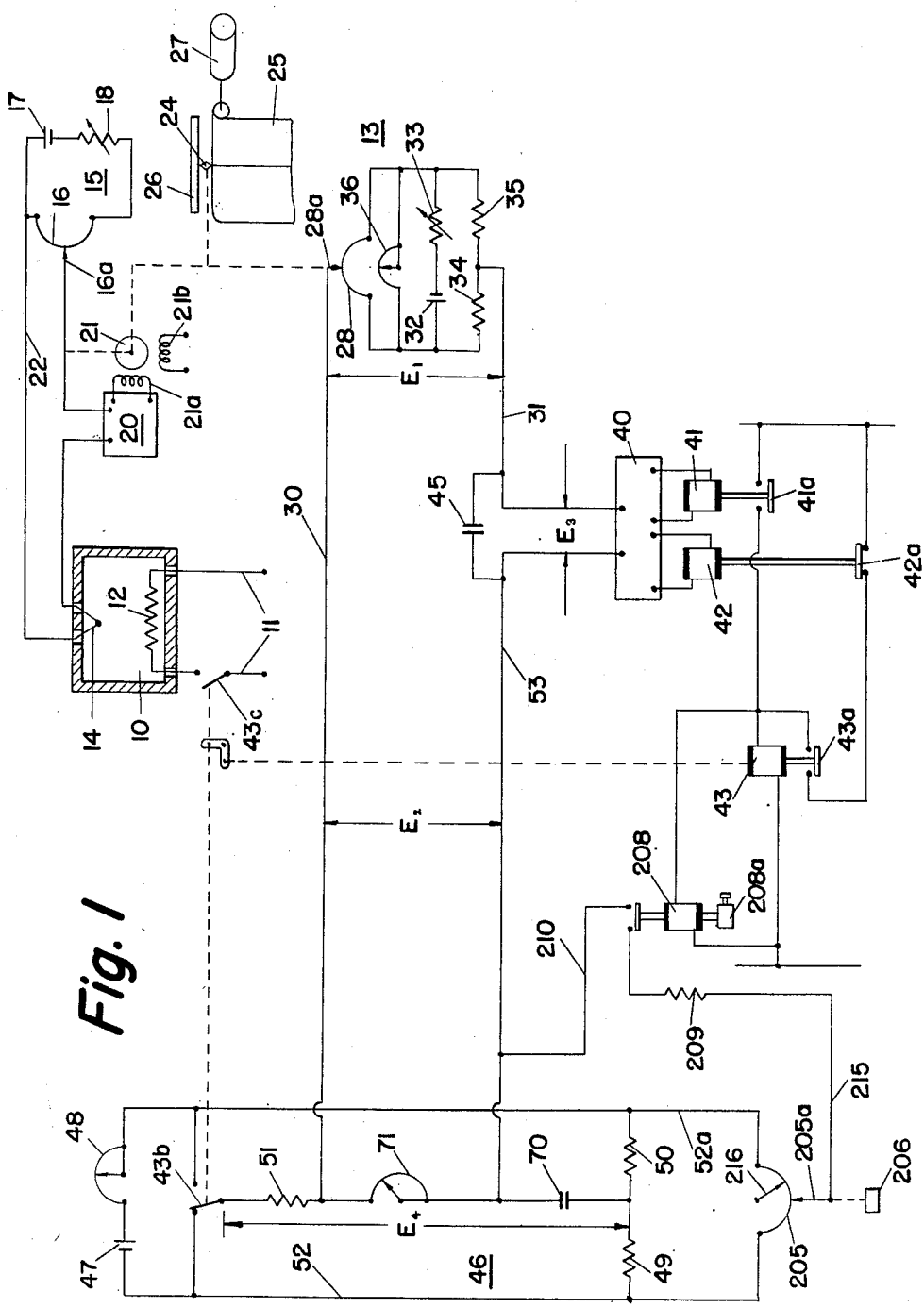

Feb. 18, 1958

E. T. DAVIS 2,823,861

CONTROL SYSTEMS WITH RATE OF APPROACH

Filed Oct. 4, 1956

3 Sheets-Sheet 1

Feb. 18, 1958     E. T. DAVIS     2,823,861
CONTROL SYSTEMS WITH RATE OF APPROACH
Filed Oct. 4, 1956     3 Sheets-Sheet 2
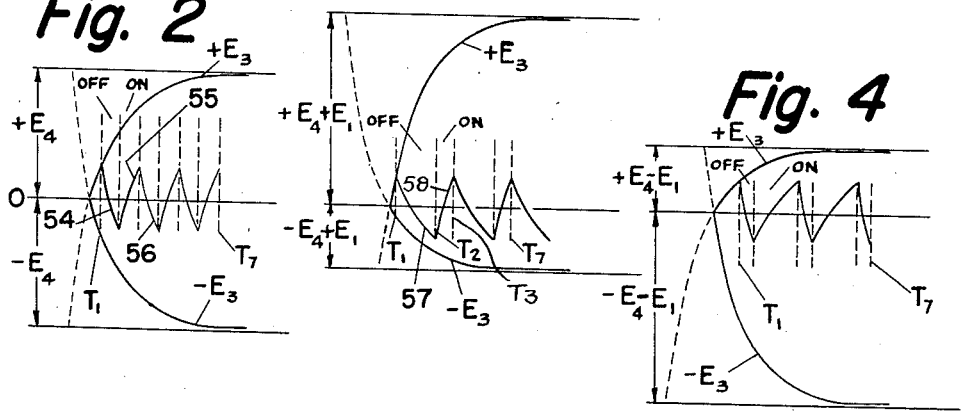
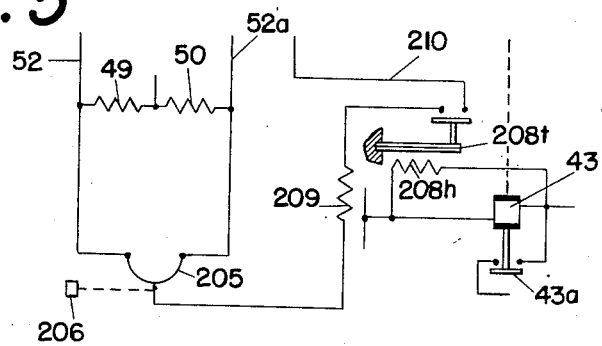
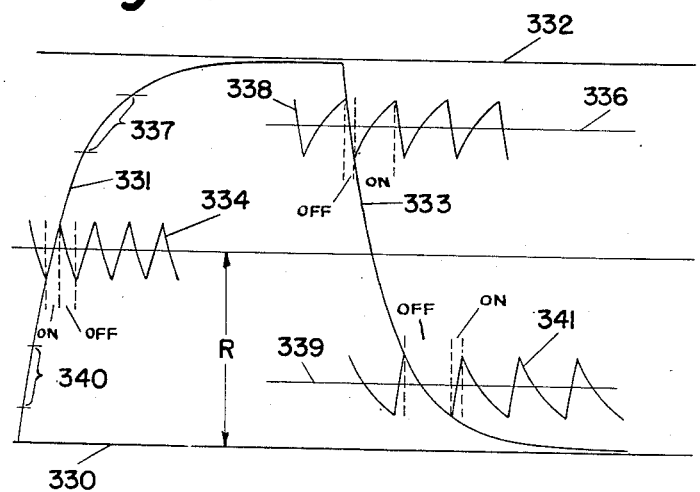

Feb. 18, 1958     E. T. DAVIS     2,823,861
CONTROL SYSTEMS WITH RATE OF APPROACH
Filed Oct. 4, 1956     3 Sheets-Sheet 3

United States Patent Office

2,823,861
CONTROL SYSTEMS WITH RATE OF APPROACH

Elwood T. Davis, Havertown, Pa., assignor to Leeds and Northrup Company, Philadelphia, Pa., a corporation of Pennsylvania Application October 4, 1956, Serial No. 614,015

21 Claims. (Cl. 236—68)

This invention relates to control systems of the duration-adjusting type where the magnitude of a controlled variable is changed by variation of the average time a final control element is in one or the other of two control positions, and has for an object the provision of circuit arrangements by means of which a shift of the proportional band, due to reset action, is limited, or even reversed, when the final control element remains in one of its said positions beyond a predetermined time interval.

This application is a continuation-in-part of my application Serial No. 302,794, filed August 5, 1952, for "Control Systems of the Duration-Adjusting Type" and which has issued as Patent 2,797,291. The present invention is directed to the features of said earlier application relating to a control action therein designated as a "rate-of-approach corrective action."

In systems such as disclosed in my aforesaid parent application, Serial No. 302,794, and also in my Patents 2,300,537 and 2,325,232, a final control element is cyclically operated from one to the other of two control positions. By varying the average time the control element occupies one or the other of its positions, the controlled variable is maintained at a control point closely corresponding with a predetermined desired magnitude thereof. In by two earlier patents, above referred to, I discussed the problem which arises when a system including reset (sometimes called droop-correcting) control action is brought into operation. Such problems likewise arise with batch operations where successive loads are to be heated (or cooled). Each time a new load is imposed upon the heating (or cooling) system, the controlled medium, which may be the heating current to furnace-heating resistors, will normally be maintained at its maximum value. In order to avoid over-shoot of the control point in accordance with systems shown in my two earlier aforesaid patents, there was introduced in response to the extent of departure of the controlled variable from the control point a modified action of the control system which provided an anticipatory action to assure resumption of the cycling of the final control element prior to attainment of the control point. While such systems were satisfactory, they nevertheless required apparatus operative in response to a predetermined departure of the controlled variable from the control point in order to produce the needed modification in the action of the control system.

In accordance with the present invention, there is provided a simpler system than those of my aforesaid patents with equal or greater reliability and which are characterized by the fact that over-shoot is prevented by a modified action of the control system which is wholly independent of the extent of departure of the controlled variable from the control point and which is operable in response to an increase above a predetermined value in the average time the control element remains in one or the other of its positions to assure a cycling action which minimizes or prevents over-shoot of the control point.

Figures 6, 8:
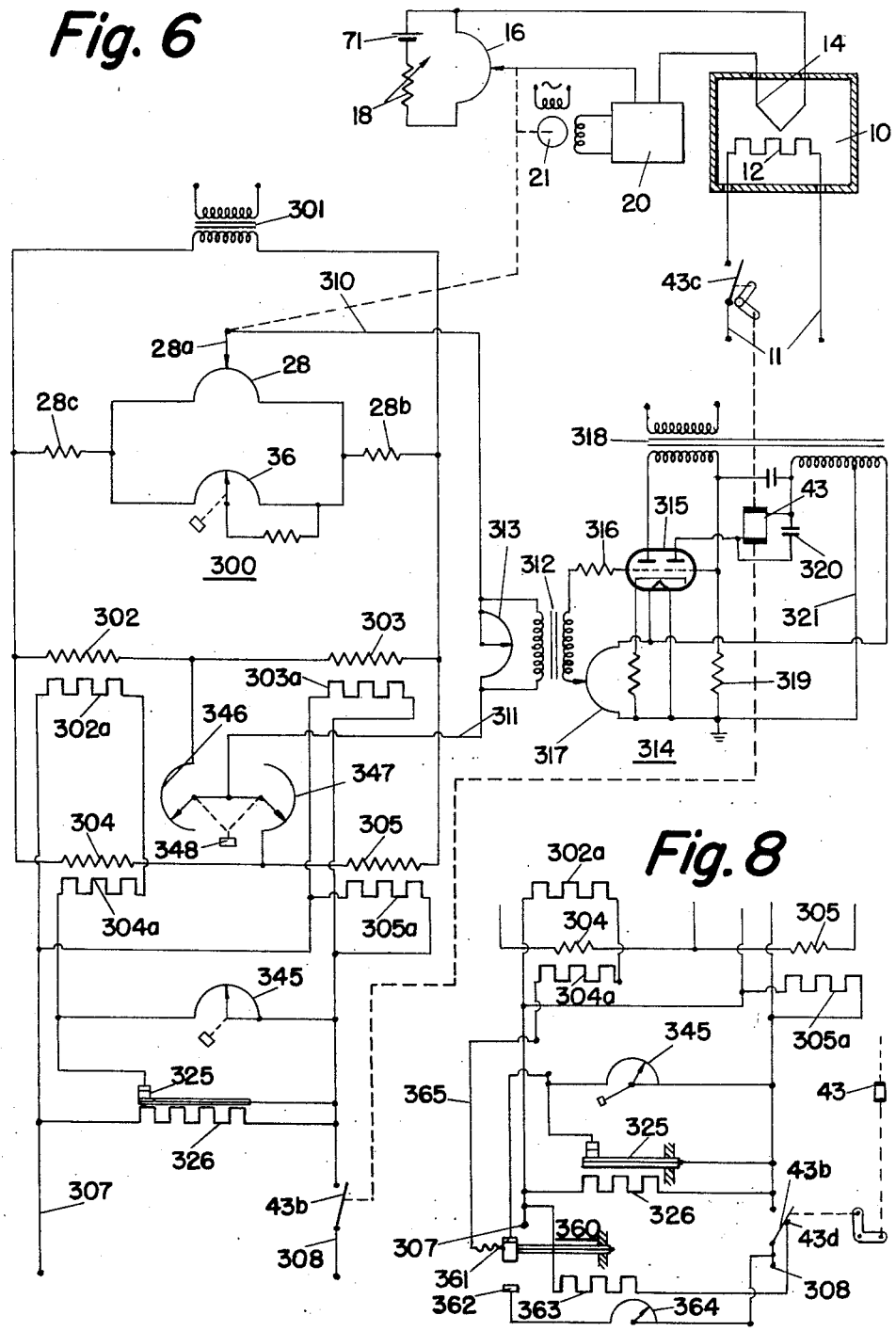

For further objects and advantages of the invention, reference is to be had to the following detailed description taken in conjunction with the accompanying drawings, in which:

Fig. 1 diagrammatically illustrates the invention as applied to a resistor-capacitor control system;

Figs. 2–4 are graphs explanatory of the operation of the control system of Fig. 1;

Fig. 5 schematically illustrates a modification of Fig. 1 and includes a fractional part of Fig. 1 together with certain changes therein;

Fig. 6 diagrammatically illustrates the invention as applied to a control system including heater-resistor assemblies;

Fig. 7 includes graphs explanatory of the operation of Fig. 6; and

Fig. 8 is a fractional diagram including a part of Fig. 6 illustrating a further modification of the invention.

Referring to Fig. 1, the invention has been shown as applied to the control of temperature though it is to be understood it is equally applicable ot the control of the magnitude of any condition, hereinafter referred to as the "controlled variable." Where, as in Fig. 1, the temperature of an enclosure, such as a furnace 10, is to be maintained at a predetermined value which may be referred to as the "set point," the controlled medium is the current flowing from supply lines 11 through a heating resistor 12 during the time a circuit making and breaking device 43c is in closed position. Variation in the magnitude of the controlled variable, temperature, is detected by the measuring junction of a thermocouple 14 located within the enclosure 10, the output of which is opposed by a voltage derived from a potentiometer 15 including a slidewire 16, a battery 17, and a rheostat 18. By means of any suitable detecting and amplifying device 20, such as shown in Williams Patent No. 2,113,164, a motor 21, having a control winding 21a energized by the detecting and amplifying device 20 and a power winding 21b, adjusts slidewire contact 16a in a direction to reduce the difference between the potential developed by thermocouple 14 and the potential difference between conductor 22 and slidewire contact 16a.

With the adjustment of slidewire contact 16a there are simultaneously driven a pen and index 24 relative to a chart 25, the associated scale 26, and a movable contact 28a relative to a control slidewire 28. The chart 25 is driven at constant speed by any suitable means such as a motor 27. The control slidewire 28 forms a part of the control circuit including conductors 30 and 31. Current flows from a battery 32 through slidewire 28 and a rheostat 33 in network 13. With conductor 31 connected intermediate resistors 34 and 35 of equal resistance values, it will be seen that zero potential difference will be developed between conductors 30 and 31 with contact 28a in its mid-position. A proportional-band adjusting resistor 36 is connected in parallel with slidewire 28.

From the foregoing it will be seen that as the motor 21 in response to change in temperature of thermocouple 14 moves slidewire contact 28a from its mid-position, there will be developed a potential difference of voltage $E_1$ of one polarity or the other depending on the direction of temperature change and of magnitude depending upon the extent of that change.

An amplifier 40 controls the energization of relays 41 and 42 in response to the difference between the voltage $E_1$ and a second potential difference or voltage $E_2$. The relay 41 controls the energization of a circuit maker and breaker 43 which may be a contactor of any suitable type having normally open holding contacts 43a, the contact element 43b movable between two circuit-controlling positions and the movable contact element 43c for controlling the power circuit of heating resistor 12. When relay 41 is energized by amplifier 40, it closes its contacts 41a to energize the operating coil of contactor 43 which thereupon by contact 43c closes the heating circuit, moves contact 43b to its second circuit-closing position, and closes the circuit through contacts 43a to maintain the contactor 43 in its energized position. When relay 42 is energized, it opens its contacts 42a, thus interrupting the circiut through the operating coil of contactor 43 which thereupon is deenergized to return its contacts to their illustrated positions.

The potential difference or voltage $E_2$ is developed from a control network 46 which includes a battery 47, an adjustable proportional band rheostat 48, and resistors 49 and 50, preferably of equal resistance. As shown, the voltage $E_2$ is derived from conductor 30 by way of resistor 51 and by way of contact 43b to conductor 52 leading to the negative pole of battery 47; and by way of conductor 53 connected to the junction between a reset slidewire 71 and a reset capacitor 70.

In systems of the type in which there is a predetermined relation between the value of the controlled variable (the temperature of enclosure 10) and the time-average position of the final control element 43c which is moved periodically between its fixed positions, the percentage of "on-time" of the final control element is made dependent upon the value of the controlled variable. By reason of the inclusion of the reset resistor or slidewire 71 and the reset capacitor 70, there is introduced into the operation of the system a reset control action. The reset action (which may also be referred to as an integral action, i. e., one in which the control system has a component of control action which varies in accordance with a time integral function of the controlled variable) corrects for offset or droop.

For simplicity in describing the manner in which the network 46 provides for cyclic operation of the final control element 43c with change in average time in one of its control positions, it will be assumed the reset capacitor 70 is bridged by a conductor, i. e., short-circuited. The effect of the reset resistor 71 will be neglected. It may be considered as omitted or as having a value many times that of resistor 51. In practice, it may have a value as high as 100 megohms as compared with the resistor 51 of, say, 3 megohms.

With slidewire contact 28a of network 13 at its illustrated mid-position, the potential difference $E_1$ between conductors 30 and 31 will be zero. There will then be a charging current for capacitor 45 due solely to the potential difference $E_4$ derived from network 46, the polarity of that potential difference reversing with each operation of element 43b operated with element 43c. Thus, the capacitor 45, which is a signal-storing means for amplifier 40, will be charged through a circuit including resistor 51 first in one direction and then in the opposite direction.

The operation can be readily visualized by referring to Fig. 2 where values of the voltage $E_4$ are shown by horizontal lines, one being the value in a positive direction and the other being the value in the negative direction, the average value between the two limits being shown by the horizontal "zero" line. With the parts in the position shown in Fig. 1 and with no charge on capacitor 45, upon application of the voltage $+E_4$, switch 43b in its right-hand position, the potential difference or voltage $E_2$ (equal to $E_3$) rises in the manner illustrated by the graph $+E_3$. If the voltage $-E_4$ is applied, switch 43b in its left-hand position, voltage $E_3$ rises or increases in the negative direction as illustrated by the graph $-E_3$. The graphs $+E_3$ and $-E_3$ are exponential curves and illustrate the rise in voltage in the positive and negative directions in the absence of the occurrence of the control now to be described. It is to be understood that the graphs $+E_3$ and $-E_3$ may begin at any voltage value, depending upon the charge on capacitor 45, and follow an exponential charging curve toward the voltage $E_4$. For example, if the charge on capacitor 45 were a maximum in the negatitve direction, and a positive $E_4$ were applied, the change of $E_3$ would follow the brokenline extension of $+E_3$.

It will now be assumed that the element 43b has just arrived at its left-hand position, this occurring at the time $T_1$. At time $T_1$ the voltage $E_4$ of negative polarity is applied to the charging circuit including resistor 51, conductors 30, 31 and capacitor 45. The voltage $E_2$ discharges the capacitor 45 with respect to time as illustrated by the graph 54 which, of course, follows the appropriate portion of the $-E_3$ graph. When the negative voltage across the input terminals of amplifier 40 exceeds the sensitivity range of amplifier 40, the relay 41 is energized and through closure of its contacts 41a energizes contactor 43 to close the heater circuit and to move contact element 43b to its right-hand position. The polarity of $E_4$ is immediately reversed and the potential difference $E_3$ immediately rises as indicated by the graph 55 having the shape of the appropriate portion of graph $+E_3$. When $E_3$ attains the maximum value shown in Fig. 2 by graph 55, relay 42 is energized to open contact 42a and to deenergize contactor 43 for the return of the contacts to their illustrated positions. The potential difference $E_3$ then decreases as indicated by the graph 56, of the same shape as the corresponding part of graph 54, and, as indicated by the dotted lines and labels, the "off" time is equal to the "on" time; that is to say, current flows through the heating resistor 12 during a series of predetermined time intervals, each heating interval being spaced by a non-heating interval of equal length or duration.

The manner in which the ratio of "time-on" to "time-off" may be varied in order to vary the average magnitude of the controlled variable and the heat input to the enclosure 10 will now be described.

If there is variation in the temperature of the furnace or enclosure 10, the changed output of thermocouple 14 will through the operation of motor 21 be indicated on scale 26 and, if desired, recorded on the chart 25. The motor will also move contact 28a from its mid-position in a direction depending upon the direction of change of the temperature. If the temperature is too high, it will be assumed that the contact 28a will be moved to the right of its mid-position. The effect of the movement is to develop a voltage or potential difference $E_1$ of magnitude related to the departure of the temperature from its predetermined value, generally referred to as the set point. With movement of contact 28a to the right, the polariy of voltage $E_1$ will be such that conductor 30 will be made negative and conductor 31 positive. Thus, potential difference $E_1$ will be in opposition to or of opposite polarity with respect to potential difference $-E_4$ and additive with respect to $+E_4$. As shown in Fig. 3, the capacitor charging voltage $(-E_4+E_1)$ with $E_4$ negative, corresponding with the illustrated position of the parts, will be reduced in magnitude by right-hand movement of contact 28a. However, when switch element 43b is moved to its right-hand position, the capacitor charging voltage $(+E_4+E_1)$ is increased. The net result is that at the time $T_1$ the instant the parts are moved to their illustrated positions, the decreased charging voltage $(-E_4+E_1)$ will be applied to the capacitor charging circuit and it will discharge along the appropriate portion of exponential graph $-E_3$. The applicable portion of graph $-E_3$ is of considerably different shape than the applicable portion of the $-E_3$ graph of Fig. 2. Because of the slower discharge of the capacitor and the slower rise of its charge to the illustrated negative potential, a considerably longer time is required for $-E_3$ to reach maximum negative values corresponding with those illustrated in Fig. 2. Thus, the "off-time," as shown, is greatly increased. On the other hand, at the instant of attainment of that value of negative voltage needed to energize the coil of relay 41 there is applied by operation of element 43b a capacitor charging voltage of greater value (greater by $E_1$), than shown in Fig. 2. The time required as indicated by the graph 58 for $E_3$ to rise to the same positive values as shown in Fig. 2 is decreased and hence, the "time-on" or the time during which heating current flows through resistor 12 is made materially less than shown in Fig. 2.

By comparison of Figs. 2 and 3, it will be seen that two things have occurred. First, as already explained, there has occurred the increase in the "off-time" as compared with the "on-time." Secondly, the frequency of application of the controlled medium, the heating current, has been decreased. From time $T_1$ to time $T_7$ it will be seen that in Fig. 2 the control element 43c was operated and maintained in its closed position during three heating periods. On the other hand, in Fig. 3 there were only two heating periods, each being shorter than each corresponding period of Fig. 2. By reason of this dual change in operation, the temperature of the furnace or enclosure 10 will immediately decrease. As the temperature changes, the contact 28a of control slidewire 28 will be correspondingly adjusted and there will be a gradual change in the relative on and off times until the average "time-on" is of a length and frequency to develop by the control medium, the heating current, a temperature in furnace 10, which is maintained at a control point. The control point and the set point are separated by a temperature difference dependent upon the load on the furnace. This difference is generally referred to in the control art as offset or droop.

Had the temperature of furnace 10 changed in the opposite direction, below the set point, the motor 21 would have moved the contact 28 to the left and the potential difference $E_1$ would appear with a positive polarity at conductor 30 and a negative polarity at conductor 31. Accordingly, $E_1$ would be in aiding relation with $-E_4$ and as shown in Fig. 4, the negative capacitor charging voltage greatly exceeds the positive. An action opposite to that described in connection with Fig. 3 is now achieved.

At time $T_1$, Fig. 4, the potential difference $E_3$ rapidly decreases to the required negative value for the operation of relay 41. After operation of contactor 43b the decreased positive charging potential requires an extended period to attain the value required for operation of the coil of relay 42. Thus, the "off-time" is decreased and the "on-time" increased. The frequency of operation is again decreased, the two long "time-on" cycles replacing the three shorter "time-on" signals of Fig. 2.

Referring now to the operation of the system of Fig. 1 including the reset resistor 71 and the reset capacitor 70, it will be seen at once that the voltage or potential difference $E_4$ is now applied to a series branch including resistor 51, reset resistor 71 and capacitor 70. The voltage $E_2$ is that appearing across reset resistor 71. With the controlled variable at the control point ($E_1=0$), the average value of the voltage $E_2$ will be maintained at zero and will vary in manner quite similar to the voltage $E_3$ across capacitor 45. However, it is important here to observe that the potential difference or voltage $E_2$ appears only as the result of current flow through resistor 71 and that current flowing through resistor 71 flows only into or out of capacitor 70.

If it now be assumed that the temperature of compartment 10 is above the control point, the movement of contact 28a to the right of center on slidewire 28 will make conductor 30 negative with respect to conductor 31. By reason of the addition of this voltage $E_1$ to the series loop including capacitor 45 and resistor 71, the limits between which the voltage $E_3$ changes will be modified as already explained in connection with Fig. 3. However, because of the inclusion of capacitor 70 and reset resistor 71 the following occurs.

At time $T_1$, Fig. 3, and as contact 43b arrives in its left-hand position, the voltage $-E_4$ is applied in a direction to discharge capacitor 45. The time interval of discharge is relatively long as indicated by graph 57. During that relatively long interval from $T_1$ to $T_2$ the capacitor 70 receives a charging current of magnitude which develops across resistor 71 a voltage $E_2$. At time $T_2$, Fig. 3, contact 43b of Fig. 1 moves to its right-hand position to reverse the polarity of the voltage $E_4$. The charge accumulated on capacitor 70 during the described operation has a polarity which is additive with respect to $+E_4$. Accordingly, capacitor 70 from time $T_2$ to $T_3$ discharges with contact 43b in its right-hand position, but it does not become fully discharged by reason of the relatively short time interval between $T_2$ and $T_3$. During that time interval the voltage $E_3$, Figs. 1 and 3, rises to a value which produces operation of relay 42 to return element 43b to its left-hand position. Accordingly, when contact 43b returns to its left-hand position there will be on capacitor 70 a part of its initial charge with the upper plate thereof negative and the lower plate positive. That remaining charge then is of a polarity which opposes $-E_4$. Successive discharge cycles are in that way made longer because of the additional decrease in the net-negative charging voltage for capacitor 45 resulting from the charge on capacitor 70 and because of the increase in the net-positive charging voltage for capacitor 45. Thus, the effect of the reset resistor 71 and of the reset capacitor 70 is to increase and make larger the charging effect of the quantity ($+E_4+E_1$) by an amount which may be termed $E_{70}$, the voltage acquired by capacitor 70, and the charging effect of the quantity ($-E_4+E_1$) is made smaller by the charge remaining on capacitor 70.

From the above discussion it will be seen that the charge acquired by capacitor 70 or the resultant potential difference developed by it is effective in changing the magnitude of the charging and discharging voltages applied to capacitor 45. The extent of the change in their magnitude will depend upon whether the change in the charge on capacitor 70 is greater with contact 43b in one position than it is in the other position. As shown in Fig. 3, and as above explained, that charge will be greater during the relatively long time intervals contact 43b is in its left-hand position as compared with the time it is in its right-hand position. If the charge on capacitor 70 due to current flowing through resistor 71 into capacitor 70 over a given time interval exceeds the loss of that charge due to current flowing from capacitor 70 through a given time interval there will be a net charge remaining on the capacitor 70.

The foregoing states that the net charge will depend upon the time integral of the current flowing to capacitor 70 with contact 43b in one position as compared with the time integral of the current flowing from capacitor 70 with the contact 43b in its other position. With the condition away from the control point, $E_1$ has a finite value and thus produces larger potential differences on capacitor 70 with each successive cycle, each cycle being ended by the movement of contact 43b from one to the other of its positions. As the controlled variable, the temperature of furnace 10, is returned toward the control point the time integral of current flow to capacitor 70 approaches equality with the time integral of current flowing from capacitor 70. Nevertheless, because the capacitor 70 has already acquired a net charge, that net charge remains and thus leaves in the control system a modifying potential difference which corrects for changes in the load which otherwise would produce offset or droop. That corrective action has heretofore been referred to as reset action. Offset has been defined as the steady-state difference between the control point and the value of the controlled variable corresponding with the set point. It is recognized as an inherent characteristic of proportional control systems including those of the average-position action type.

It is to be further understood that when the controlled variable, or the temperature of furnace 10, changes in a direction opposite to that above described and in a direction requiring additional heat, the contact 28a is moved to the left to make conductor 30 positive and conductor 31 negative. The situation represented by Fig. 4 again applies and the above description with respect to capacitor 70 likewise applies except, of course, that the capacitor 70 will soon acquire a charge of opposite polarity to that above described and its modifying action will augment the action shown in Fig. 4 and previously described.

The rate of reset action depends upon the requirements of the particular process under control and that rate can be readily changed by adjustment of resistor 71 as by its contact.

Reset action in Fig. 1 may also be explained in terms of average values of the several potentials. It will be recalled that when $E_1$ is zero, $E_3$, the input potential to the amplifier 40, will have an average value of zero and $E_2$, equal to $E_3$, will have an average value of zero. Since the potential difference across resistor 71 is equal to $E_2$, it too will have an average value of zero. It will be recalled that when $E_1$ is finite, the operation of the amplifier 40 and the relays 41 and 42 are modified so that there is developed the voltage $E_2$ having an average value equal and opposite to $E_1$. With reset resistor 71 and reset capacitor 70 in the circuit, the average current flowing through resistor 71 must be such as to produce the average potential difference $E_2$ equal and opposite to $E_1$. But the current flowing through resistor 71 produces a charge on reset capacitor 70 which requires a different length of time of contact 43b in one or the other of its positions in order that the average potential difference across resistor 71 shall be equal and opposite to $E_1$. The change in "time-on" and "time-off" is thus introduced by the presence of resistor 71 and of capacitor 70 and the change is in the direction to introduce the reset action.

There will now be considered the operation of the system beginning with a cold furnace or one in which the temperature is far below that corresponding with the control point. Under the assumed conditions the preferred operation will be fully automatic to bring the temperature of the furnace 10 up to the control point. Under the assumed condition of operation, $E_1$ will be large because of the stated assumption the temperature of furnace 10 is well below the control point. As $E_1$ increases due to a temperature drop, the system continues to increase the "time-on" relative to the "time-off" until, finally, the element 43b and contactor element 43c will remain continuously in their "on" positions. It will thus be seen that in that event or with the "time-on" greatly exceeding the "time-off," the heat input to furnace 10 will inevitably be greater than necessary to maintain its temperature at the control point. Quite aside from the foregoing considerations, if the final control element 43c remains in one of its controlling positions for a long enough time interval it will be seen that the voltage developed across capacitor 70 will equal the charging voltage $E_4$. The result will be a zero potential drop across resistor 71. Hence $E_2$ will have a zero value. The foregoing will necessitate a reversal in polarity of voltage $E_1$ in order to operate the final control element 43c to the other of its control positions. This means that the temperature of compartment 10 must be returned to and slightly beyond the control point under conditions in which the final control element has been maintained in one of its controlling positions for a long time interval prior to attainment of the control point. Such an action generally will result in over-shooting of the control point. Since the likelihood of over-shooting the control point is very great in many applications of the invention, it is desirable to introduce a further control action to prevent over-shoot. Such a control action is introduced into the system of Fig. 1 by a time-delay relay 208 which may be of the thermal type in which contacts are moved from a closed to an open position in response to the integrated heat release of a heating element energized with each operation of contactor 43. As shown, however, the relay 208 is of the dashpot type with the time of closure under control by dashpot 208a. The relay 208 is of the time-closing type and opens without time delay. In a typical embodiment of the invention the contactor 43c would normally be cycled with an "on-time" of substantially less than three minutes. An "on-time" of three minutes or more would correspond to an "off-time" of practically zero and hence to substantially continuous heat input to the furnace. Accordingly, in this instance the dashpot 208a is set for closing of the relay 208 during cyclic operation of contactor 43 whenever its "on-time" exceeds three minutes.

Again assuming that the system is cyclic with the "on-time" approaching or equalling that required for full heat input, it will be remembered that a charge will be building up on reset capacitor 70. The building up of the charge on reset capacitor 70, as heretofore explained, tends to increase the length of the "on-time" with corresponding decrease in the length of the "off-time." However, upon closure of the rate-of-approach relay 208 a discharge circuit is completed for capacitor 70 through conductors 211, 210, contacts of relay 208, a high-resistance resistor 209, and the slidewire contact 205a shown at the same potential as the lower side of capacitor 70. With the discharge circuit established for the capacitor 70, current will also flow through that circuit from contact 43b, through resistors 51 and 71, conductors 53, 210, contacts of relay 208 and by way of resistor 209 to the slidewire 205. Thus the potential difference $E_2$ will have a finite value which will modify the operation of the system as a whole and produce a balance of the network prior to the attainment of the control point and hence prior to reversal of the voltage $E_1$ which occurs as a result of change in the controlled variable beyond the control point. Thus the completion of the discharge circuit for capacitor 70 not only reduces the potential difference across that capacitor for later reduction of the length of the "on-time" relative to the "off-time" but, assures that the controlled variable enters the proportional band earlier than it otherwise would and thus an anticipatory action is provided which tends to prevent over-shoot since the heat-input to furnace 10 is reduced prior to attainment of the control point.

The foregoing analysis assumed slidewire contact 205 remained in its mid-position and hence at the same potential as the lower end of capacitor 70. If slidewire contact 205a is other than in its mid-position a potential difference will be developed between the upper side of capacitor 70 and the lower side thereof with a polarity dependent upon the position of the contact 205a from its mid-position. Assuming now that contact 205a is in its rightmost position, completing a circuit directly to conductor 52a, it will be seen that the maximum charging voltage for capacitor 70 then appears between conductors 52a and 215. Accordingly, capacitor 70 will not discharge. However, if contact 205a is placed along slidewire 205, say about half-way from its "zero" end and "center," the voltage introduced will be less than the maximum charging voltage for capacitor 70 and hence the latter will discharge through the circuit including resistor 209 to a lower voltage. Thus the position of contact 205a on slidewire 205 determines the magnitude of the rate-of-approach correction. Accordingly, the slidewire 205 may be suitably calibrated. It preferably has associated with it a frictionally-held pointer such as 216 which can be set to indicate a rate of approach setting such that the temperature of the furnace 10 will be brought to the control point without over-shoot. In the absence of the present invention and under conditions under which the final control element 43c remains in one of its controlling positions until the temperature of furnace 10 attains the control point, those skilled in the art frequently describe the operation as one in which the proportional band has been shifted until one limit thereof coincides with the control point. The foregoing shift of the proportional band is avoided, however, by the action of the rate-of-approach relay 208 and the rate-of-approach setter 205a. By introducing a predetermined corrective action of magnitude dependent upon the position of contact 205a along slidewire 205, there will always be current flowing through resistor 71 by way of the discharge circuit including resistor 209 and by reason of the setting of contact 205a. Thus, the voltage $E_2$ will not approach "zero" but will always have a value related to the product of the current flowing through resistor 71 and its resistance.

As voltage $E_1$ decreases toward the control point, a reversal in control action occurs when $E_1$ exceeds $E_2$. The result is that the reversal occurs earlier than when $E_2$ is near "zero" and in terms used by those skilled in the art, the lower limit of the proportional band is moved to a temperature below the control point and by an amount dependent upon the value of $E_2$ which in turn is dependent upon the setting of the rate-of-approach contact 205a. By initiating the cycling action before the control point is reached, the heat input to the furnace 10 is decreased from its high or maximum rate. The temperature then rises less rapidly until it attains the control point. It attains the control point without objectionable over-shoot.

While the description of the several modifications has been primarily in terms of the generation of heat, it is to be understood that the invention is equally applicable to cooling systems. When it is desired to cool the compartment, such as indicated at 10, the heating coil 12 will be replaced by a refrigerating coil or heat exchanger, with the supply of the cooling medium under the control of an "on" and "off" valve. Where the contactor 43 is shown in the open position, the arrangement will be for the "on" and "off" valve also to be in its "on" or open position for flow of a maximum volume of cooling fluid. With the foregoing change, the system will function to maintain the temperature of compartment 10 at the control point. However, the rate-of-approach setter will be reversed in its action with "zero" rate-of-aproach action with contact 205a in its left-most position where it is directly connected to conductor 52 and with increasing rate-of-approach action as it is moved toward its right-most position.

While the values of the various circuit components of Figs. 1, 5, 7–9 may be varied within relatively wide limits, it is believed it may be helpful if there be presented a set of values which may be taken not by way of limitation upon the scope of the invention but as illustrative of typical embodiments of the invention. They are as follows:

Resistor 51_____ 3 megohms.
Resistor 71_____ Range, up to 100 megohms.
Capacitor 70_____ 10 mfd.
Resistors 49 and 50_____ 2,200 ohms each.
Capacitor 45_____ 20 mfd.
Resistor 209_____ 10 megohms.
Resistor 205_____ 10,000 ohms.

In the above table it will be seen that the resistor 51 and the capacitor 45 provide a time constant of sixty seconds.

While explanation has already been made as to the manner in which the rate-of-approach setter varies the position of the proportional band relative to the control point, it is emphasized that the operation of relay 208 occurs after the average value of the control agent (the heat which changes the temperature of furnace 10) exceeds a predetermined value. The average value of the control agent, of course, is established by the average time contactor element 43c remains in its closed position. Where the relay 208 operates after a predetermined period of time during which contactor element 43c is in its "on" position, the average value of the control agent will exceed a predetermined value, such, for example, as the value established when element 43c has an "off" time very short in comparison with the "on" time. Of course, the contactor element 43c may be continuously maintained in the "on" position, and after a predetermined interval, in the above description, three minutes, the relay 208 may be energized to complete the rate-of-approach-modifying circuit. On the other hand, when the relay is of the integrating type, such as the thermal relay, the operation to complete the rate-of-approach-modifying circuit will occur depending upon the magnitude of the time integral of closure of contactor element 43c. The time of closure of relay 208t of Fig. 5 will depend upon the past history of operation of that contactor element. Referring generally to said operations, it will be seen that the relay means 208t operates after the average value of the control agent exceeds a predetermined value for limiting the action of the reset capacity in shifting the proportional band.

There has been illustrated in Fig. 5 a fractional part of Fig. 1 including a thermal relay 208t in which the heating coil 208h is connected in place of the operating coil of relay 208 of Fig. 1, and there is shown associated therewith the rate-of-approach setter 205.

Referring now to Fig. 6, there has been illustrated the present invention as applied to a system similar to those disclosed in my aforesaid two earlier patents, some of the reference characters of Fig. 6 being the same as used above to indicate corresponding parts. For example, the control slidewire 28 together with rheostat 36 introduces unbalance into a balanceable electrical network 300 energized from any suitable source of supply, such as from the secondary winding of a transformer 301, a primary winding of which is connected to a source of alternating current. The circuit 300 is in the form of a double-Wheatstone bridge, two branches of which include opposite sections of slidewire 28 together with associated end coils or resistors 28c and 28b. Resistors 302 and 303 form the remaining branches of one of the bridge circuits and resistors 304 and 305 form the remaining branches of a second bridge circuit. Separate and apart from the bridge circuits are heating coils 302a—305a respectively associated with said resistors to vary the temperature thereof. Each resistor and associated heater comprises a resistor-heater assembly, the assemblies 302—302a; 303—303a; and 305—305a having lesser thermal inertia than the assembly 304—304a.

As fully explained in my aforesaid two earlier patents, the assembly 304—304a has a mass considerably greater than the other assemblies to provide the relatively greater thermal inertia so that the temperature change of resistor 304 occurs relatively slowly in comparison with the temperature changes produced by like heat inputs to the heaters associated with resistors 302, 303 and 305. Accordingly, when the heaters are concurrently energized through circuits connected to supply lines 307 and 308, the resistances of the resistors 302—305 change at significantly different rates, although they are designed to achieve the same final temperature and resistance values when continuously energized by the same voltage, all of them being constructed of material having substantial temperature coefficients of resistance.

From the network 300 there extend output conductors 310 and 311 to supply the output voltage to the primary winding of a coupling transformer 312. An adjustable resistor 313 is connected across the primary winding of transformer 312 to regulate the magnitude of the output voltage applied to the primary winding. The secondary winding of the transformer 312 is included in the input circuit of an amplifier 314 including a twin triode 315. The input circuit includes a grid resistor 316 and a zero-setting slidewire 317. The plate supply for the first stage of the amplifier is derived from one secondary winding of a transformer 318 and includes a load resistor 319. The second stage of the amplifier is coupled to the load resistor 319 and the plate or output circuit, supplied from a second secondary winding of transformer 318, includes therein the operating coil of the relay 43 bypassed by a capacitor 320 for the purpose of preventing chattering of the relay.

The secondary winding of the transformer 318, from a tap and by way of conductor 321, supplies filament current to the tube 312 and also applies a voltage across a resistor or slidewire 317. By adjusting the movable contact of slidewire 317, the output of the amplifier for zero input signal may be adjusted to bias the output relay 43 midway between the output necessary to pull it in or drop it out.

In the following brief description of the operation of the system as a whole, it will be assumed that the controlled variable, the temperature of the furnace or compartment 10, is at the control point and that the network 300 is balanced for zero output. The relay 43 is deenergized and the furnace-resistor 12 deenergized since contacts 43c are open.

The system having been in operation, the heater-resistor assemblies will have been elevated in temperature. With the contacts 43c open, the heating circuits are likewise open by reason of the contact 43b being open. Accordingly, the heater-resistor assemblies are cooling and the resistance values of the resistors 302—305 in the network 300 are decreasing. Due to their lesser thermal inertias, the temperature of resistors 303 and 305 decreases more rapidly respectively than the temperature of resistors 302 and 304. The assembly including resistor 302 preferably has a slightly higher thermal inertia than the assembly including resistor 303 with the assembly including resistor 304 having a larger thermal inertia than the assembly including resistor 305. For example, with resistors of like values and heaters producing like heating effects, the resistors 303 and 305 will attain their maximum temperatures in about one minute whereas resistor 304 will require one-half hour to attain maximum temperature. The resistor 302 will require about two minutes to attain maximum temperature. In terms of operation, the greater decrease in resistance of resistors 303 and 305 produces unbalance of network 300 and an output voltage for energization of the operating coil of relay 43 for closing contacts 43b and 43c. As soon as these contacts close, the furnace-resistor 12 is energized and heating circuits are established for heating resistors 302a—305a. The heating circuit for the droop-correcting assemblies may be traced from supply line 307 by way of heating resistors 302a, 304a, a timing relay, shown as a thermally actuated switch 325, and thence by way of contact 43b to the other supply line 308. The control relay 325 includes a bimetallic element heated by a resistor 326. The resistor 326 is energized upon closure of the contact 43b and deenergized each time that contact opens. Thus the control switch 325 will remain closed regardless of the extent of departure of the controlled variable from the control point and will only open after the contact 43b has been closed for a predetermined time interval. That time interval will vary depending upon the relative length of "on-time" and "off-time" as will be more fully later explained.

The heaters 303a and 305a are connected in parallel directly across the supply lines 307 and 308 by way of contact 43b. Because of the lower thermal inertia of the assemblies including the last-mentioned resistors, the resistances introduced into the network 300 by resistors 303 and 305 rapidly rise to reestablish balance of the network. When this occurs, the relay 43 is deenergized. Thus the network 300 provides for cyclic operation of the final control element 43c. The manner in which the "off-time" relative to the "on-time" is varied has been explained in my aforesaid two earlier patents and only a brief explanation will here be presented in terms of the graphs of Fig. 7. They have been drawn with time as abscissae and with temperature (or resistance) as ordinates.

For the thermal assemblies of low thermal inertia the temperature and the resistance of resistors 303 and 305 rises from room temperature indicated by the horizontal line 330 as indicated by a graph 331. The maximum attainable temperature for a given heating current is indicated by the horizontal upper limit 332. If after attainment of the upper limit 332 the heating current is removed, the temperature and the resistance of resistors 302 and 305 decreases as indicated by the graph 333.

Consistent with the foregoing assumptions, with the temperature of the furnace 10 at the control point, graph 334 illustrates an operation where the network 300 is balanced by resistance values indicated at R. The graph illustrates the alternate heating and cooling of the resistors through upper and lower limits corresponding with the dead-band of the change of voltage required at the amplifier 314 for operation of relay 43 from one to the other of its positions. For an average temperature or resistance value R as illustrated by graph 334, the "off-time" is equal to the "on-time." If now there is departure from the control point, the contact 28a of slidewire 28 is moved from its illustrated position further to unbalance the network 300. First, assuming that the deviation is in a direction requiring more heat to furnace 10, i. e., a reduction in temperature, then the unbalance introduced will require a higher average value of resistance of resistors 303 and 305 for balance. Accordingly, contact 43b will remain closed until the level indicated by the horizontal line 336 is attained. Since the heating characteristic will then be as indicated by the bracket 337 and the cooling characteristic will be as indicated by that part of cooling curve 333 which coincides with the graph 338, it will be seen that the "on-time" will be greatly increased relative to the "off-time." Accordingly, as long as slidewire 28 introduces the aforesaid unbalance, the cycling indicated by the graph 338 will continue.

Had the deviation in the controlled variable been in the opposite direction, contact 43b would have remained open until the cooling of resistors 303 and 305 to reduce their resistance values to the level indicated by the horizontal line 339 for operation along the section of the heating curve indicated at bracket 340 and along the cooling curve indicated by that part thereof coinciding with the graph 341 to produce "off-times" greatly in excess of the "on-times."

By reason of the droop-correcting assemblies 302—302a and 304—304a, reset action is introduced into the network in a manner which may be readily explained. The proportional-action assemblies 303—303a, 305—305a, introduces changes in resistance in the network in directions to assist in balancing the network. In contrast, the assemblies 302—302a and 304—304a introduce resistance changes in the network 300 in the same direction as the unbalance introduced by displacement of contact 28a relative to slidewire 28. The result of the foregoing is this: As the ratio of "off-time" to "on-time" is varied to return the controlled variable to the control point, the slidewire contact 28a will be moved to its illustrated midposition. The result of the changed ratio of "off-time" to "on-time," however, will have established average resistances for the assemblies 302—302a and 304—304a corresponding with the changed temperature level of such assemblies. Thus the changed ratio of the "off-time" to "on-time" will continue in effect.

From the foregoing it will be seen that the resistance values will be changed in accordance with the load demand, i. e., the length of time contact 43b remains closed. Should the load demand appear to be larger than it really is, as for example during start-up when the load is cold, the contact 43b will remain in its closed position for a time interval greatly exceeding the normal cycling time of relay 43. Since the resistors 302 and 304 tend to unbalance the network 300, it is desirable to limit the degree of unbalance produced by them at any time the contact 43b remains closed beyond a predetermined time interval. This is readily accomplished by the control switch 325 which is opened by the bimetallic thermal operating element which functions in accordance with the time integral of the heating thereof. For example, if the ratio of "on-time" to "off-time" is large, the "on-time" will be large as compared with the "off-time." Accordingly, a small further increase in the "on-time" will cause the switch 325 to open. On the other hand, if that ratio be small, a considerably longer time of closure of contact 43b will be required to open the control switch 325. When it does open, it connects into the heating circuit a control rheostat 345 to reduce the heating current through resistors 302a and 304a. By reducing the heating current, to any value desired as determined by the setting of rheostat 345, there is reduced the upper temperature to which resistors 302 and 304 may be heated and thus the extent of unbalance introduced into the network 300 by them is limited to a value materially below the normal upper limit indicated in Fig. 7 at 332.

Though not necessary to the present invention, it will be desirable to include variable resistors 346 and 347 having adjustable contacts operable by a knob 348 in selection of the reset rate, i. e., any magnitude of reset rate as between the rates established by reason of the differing thermal inertias of assemblies 302—302a and 304—304a. The assembly of lower thermal inertia establishes a high reset rate and the assembly of high thermal inertia establishes a low reset rate.

In each of the foregoing modifications of the invention there is provided means operable regardless of the extent of departure of the controlled variable from the control point and in response to an increase above a predetermined value in the average time the final control element 43c remains in one of its circuit-controlling positions materially to reduce the shift of the proportional band by the control means comprising the network 46 in Fig. 1 and the network 300 in Fig. 6. In Fig. 1 the foregoing means includes the timing relay 208 or its counterpart, the bimetallic heating relay 208t of Fig. 5. While in Fig. 6 a timing relay may be utilized, it is preferred to use a relay means responsive to the integral of the time the control element remains in one position or the other such as the relay 325 actuated by the bimetallic strip and the heater coil 326.

In both modifications of the invention, the shift of the proportional band is reduced by a selected amount: in Fig. 1 selected by the setting of contact 205a by knob 206; and in Fig. 6 selected by the setting of the rheostat 345. Though nearly always preferred as in the modification of Fig. 6, the current is reduced in the heating circuit for the higher thermal inertia assemblies 302—302a and 304—304a; nevertheless, the invention comprehends an increase in the current through the heaters for the thermal assemblies of lower thermal inertia to hasten the balancing of system 300. Also, the heating current and the heat input to the lower thermal inertia assemblies may be increased, concurrently with decrease of the heating current and heat input to the higher thermal inertia assemblies.

Referring now to Fig. 8, there appears a fractional part of Fig. 6 and enough thereof to illustrate the addition to the rate-of-approach features of Fig. 6 of additional components providing for rate-of-approach when the temperature has been above the control point and is decreasing. The parts have been illustrated in Fig. 8 in positions corresponding with that part of the cycling of the system in which the final control element 43 has its contact 43c in the open position. If the controlled variable be above the control point, then the "off-time," i. e., the period during which the contact 43c is open, is greater than the "on-time" when the circuit through contact 43c is closed. If the "off-time" exceeds a predetermined length, an integrating type of relay 360 is opened by the bimetallic element to open the circuit through contact 367 and to close a circuit through contact 362. This occurs by reason of the heating circuit for the heater 363 of switch 360 energized by a heating circuit completed through a stationary contact 43d associated with the contact 43b. Upon closure of the circuit through the contact 362 of switch 360 a heating circuit for the resistors 302a and 304a is completed from one side of the supply line 308 by way of a current-determining circuit component shown as rheostat 364, the stationary contact 362 and by way of conductor 365 to heating resistors 304a, 302a, and thence to the other side 307 of the supply line.

The effect of supplying heating current to elevate the temperatures of resistors 304 and 302 with respect to resistors 305 and 303 in network 300 (Fig. 6) is to decrease the effect of these resistors in unbalancing the circuit during operation of the system with the controlled variable above the control point. This provides a rate-of-approach action which assures cycling of the system while the controlled variable is somewhat above the control point and aids in prevention of over-shooting the control point as the controlled variable decreases. In summary, the action limits the unbalance of network 300 by reason of the cooling of resistors 302 and 304 which, if attaining the same temperature as resistors 303 and 305, would prevent attainment of balance until return of the controlled variable to and slightly beyond the control point.

In accordance with the modification of Fig. 8, it will be understood the same kind of an addition may be made to the modification of Fig. 1. Across conductors 52 and 52a there may be connected a second slidewire in a position below that illustrated for slidewire 205. From the movable contact thereof there will extend a circuit to a second relay corresponding with relay 208 and operated whenever the contacts 43a are moved to their illustrated position for a predetermined length of time to complete a circuit to the conductor 211. The action of the described modification, in terms of the effect upon the network 46, will then be the same as described for network 300. Circuit-wise, the difference is in the completion of a second discharge circuit for capacitor 70 for reduction of the potential of capacitor 70, then of opposite polarity to that acquired during operation of the system with the controlled variable below the control point for a considerable length of time.

So far as applicable the 1952 automatic control terminology adopted by the American Society of Mechanical Engineers has been utilized.

What is claimed is:

1. A control system comprising a final control element movable from one of two fixed positions to the other for varying the average magnitude of a control agent to regulate the value of the controlled variable to maintain it at a control point, circuit means for operating said control element from one of its said positions to the other and for varying the average time said element remains in one of its positions relative to the other over a range of values of said variable hereinafter referred to as the proportional band, said circuit means including a control means associated with said circuit means for shifting said proportional band in one direction as a function of the time integral of departure of said controlled variable in one direction from said control point and for shifting said proportional band in the opposite direction in accordance with the time integral of departure of said controlled variable in the opposite direction from said control point, and means operable regardless of the extent of departure of said controlled variable from said control point and in response to an increase above a predetermined value in the average time said element remains in one of its said positions materially to reduce the shaft of said proportional band by said control means.

2. The control system of claim 1 in which said last-named means includes an adjustable circuit element for varying the extent of said reduction in said shift of said proportional band.

3. The control system of claim 1 in which said circuit means includes a reset capacitor as said control means together with a charging circuit for said reset capacitor for varying the charge thereon to produce said shifting of said proportional band, and in which said means operable regardless of the extent of departure of said controlled variable from said predetermined value completes a second circuit to said reset capacitor for changing the charge thereof.

4. The control system of claim 3 in which said second circuit includes a potentiometer adjustable for selection of the charge upon said reset capacitor.

5. The control system of claim 1 in which said circuit means includes circuit components each comprising a resistor with an associated heating coil for varying the temperature of the resistor to change the resistance thereof in said circuit means, certain of said circuit components having a higher thermal inertia than others of said components and connected in said circuit means for producing said shifting of said proportional band, a heating circuit independent of said circuit means operable to energize and to deenergize said heating coils upon movement of said final control element between its said fixed positions, and in which said means operable regardless of the extent of departure of said controlled variable from said predetermined value reduces the energization of the heating coils of said circuit components having the higher thermal inertia.

6. The system of claim 5 in which said last-named means includes an adjustable current-varying circuit component for selection of a predetermined lower value of heating current for said circuit components of higher thermal inertia.

7. A control system comprising a final control element movable from one of two fixed positions to the other for varying the average magnitude of a control agent to regulate the value of the controlled variable to maintain it at a control point, circuit means for operating said control element from one of its said positions to the other and for varying the average time said element remains in one of its positions relative to the other over a range of values of said variable hereinafter referred to as the proportional band, said circuit means including a control means associated with said circuit means for shifting said proportional band in one direction as a function of the time integral of departure of said controlled variable in one direction from said control point and for shifting said proportional band in the opposite direction in accordance with the time integral of departure of said controlled variable from said control point in the opposite direction, and means operable regardless of the extent of departure of said controlled variable from said control point and in response to an increase above a predetermined value in the average time said element remains in one of its said positions for reversing to a limited degree the shift of said proportional band due to the action of said control means.

8. A control system comprising a final control element movable from one of two fixed positions to the other for varying the average magnitude of a control agent to regulate the value of the controlled variable, circuit means including a storage capacitor, a resistor and a source of supply for operating said control element from one of its said positions to the other and for varying the time said element remains in one of its positions relative to the other over a range of values of said variable hereinafter referred to as the proportional band, said circuit means also including a reset capacitor effectively connected in series-circuit relation with said circuit means for said storage capacitor for shifting said proportional band in one direction as a function of the time integral of departure of said controlled variable in one direction from the control point and for shifting said proportional band in the opposite direction in accordance with the time integral of departure of said controlled variable in the opposite direction from said control point, and means including a relay and charge-modifying circuit operable after said average value of said control agent exceeds a predetermined value for limiting the action of said reset capacitor in shifting said proportional band.

9. The combination set forth in claim 8 in which said relay is a timing relay.

10. The combination set forth in claim 9 in which said relay operates whenever the average time during which said final control element is maintained in one of its said positions exceeds a predetermined value.

11. A control system comprising a balanceable network having a circuit element for unbalancing said network in response to departure of a controlled variable from a predetermined value, said balanceable network having additional circuit components each comprising a resistor with an associated heating coil for varying the temperature of the resistor to change the resistance thereof, means including a final control element operable in response to unbalance of said network between two circuit controlling positions for varying the average magnitude of a control agent in regulation of the magnitude of said controlled variable, means operable when said final control element is in one of its said positions for energizing said heating coils and when in the other of said positions for deenergizing said heating coils, the cyclic energization of said coils producing alternate balance and unbalance of said network for cyclic operation of said final control element, the resistor of a first of said additional components being varied in a direction to rebalance said network upon unbalance thereof by said circuit element, the resistor of a second of said additional components varying in a direction to increase the unbalance produced by said circuit element, and means operable whenever said control element is maintained in one of its said postions beyond a predetermined time interval for relatively changing the energization of said heaters of said first and said second circuit components for increasing the circuit-balancing effect of said first circuit component relative to the unbalancing network effect of said second circuit component.

12. A control system comprising a balanceable network having a circuit element for unbalancing said network in response to departure of a controlled variable from a predetermined value, said balanceable network having additional circuit components each comprising a resistor with an associated heating coil for varying the temperature of the resistor to change the resistance thereof, means including a final control element operable in response to unbalance of said network between two circuit controlling positions for varying the average magnitude of a control agent in regulation of the magnitude of said controlled variable, means operable when said final control element is in one of its said positions for energizing said heating coils and when in the other of said positions for deenergizing said heating coils, the cyclic energization of said coils producing alternate balance and unbalance of said network for cyclic operation of said final control element, said additional circuit components respectively having materially differing thermal inertia, the circuit component with the lesser thermal inertia having its resistor connected in the network for producing network balance upon unbalance thereof by said circuit element, the resistors of said components of higher thermal inertia being connected in said network to increase the network unbalance produced by said circuit element, and means operable regardless of the extent of departure of said controlled variable from said predetermined value and in response to a time interval exceeding a predetermined length during which said final control element is maintained in one of its positions for changing the energization of said heaters of said circuit components of higher thermal inertia for decreasing their circuit unbalancing effect.

13. A control system comprising a balanceable network having a circuit element for unbalancing said network in response to departure of a controlled variable from a predetermined value, said balanceable network having additional circuit components each comprising a resistor with an associated heating coil for varying the temperature of the resistor to change the resistance thereof, means including a final control element operable in response to unbalance of said network between two circuit controlling positions for varying the average magnitude of a control agent in regulation of the magnitude of said controlled variable, means operable when said final control element is in one of its said positions for energizing said heating coils and when in the other of said positions for deenergizing said heating coils, the cyclic energization of said coils producing alternate balance and unbalance of said network for cyclic operation of said final control element, said additional circuit components respectively having materially differing thermal inertia, the circuit component with the lesser thermal inertia having its resistor connected in the network for producing network balance upon unbalance thereof by said circuit element, the resistors of said components of higher thermal inertia being connected in said network to increase the network unbalance produced by said circuit element, and means operable regardless of the extent of departure of said controlled variable from said predetermined value and in response to a time interval exceeding a predetermined length during which said final control element is maintained in one of its positions for changing the energization of said circut components of higher thermal inertia for decreasing their circuit unbalancing effect comprising a timing relay energized by movement of said final control element to one of its positions and after expiration of said time interval operable from one circuit controlling position to a second circuit controlling position, said timing relay in said second position completing a connection to said heaters through a current-reducing circuit component.

14. The control system of claim 13 in which there are provided a second timing relay and a second, normally open, energizing circuit for said heaters of said circuit components of higher thermal inertia, said second timing relay being operable in response to a time interval exceeding a predetermined length during which said final control element is maintained in the other of its positions for closing said normally open heating circuit.

15. A control system comprising a balanceable network having circuit means for cyclically balancing and unbalancing said network, means responsive to change in said balance of said network for cyclically operating a final control element from a first controlling position to a second controlling position for varying the average magnitude of a control agent in regulation of the magnitude of a controlled variable, said balanceable circuit including a plurality of heater-resistor assemblies, heating circuits for said assemblies for changing in the balanceable network the resistance values thereof, said heating circuits being opened and closed in response to movement of said final control element from one to the other of its positions, and means operable whenever said final control element is maintained in one of its said positions beyond a predetermined time interval for changing the energization of one of said heating circuits relative to another of said heating circuits.

16. A control system having a final control element movable from one of two fixed positions to the other for varying the magnitude of a controlled variable, electrical means operable upon application thereto of a signal of one level for actuating said final control element to one of its said positions and operable upon application thereto of a signal of a different level for moving said final control element to the other of its said positions, signal-storing means, means including a source of supply and electrical resistors forming with said signal-storing means an input circuit for said electrical means for applying thereto a signal of amplitude related to the signal-level acquired by said storing means, means operable with said final element in one position for completing a charging circuit for said storing means to change the signal-level thereof in one direction and in its other position for completing a discharging circuit for changing said signal-level in the opposite direction, means responsive to change in said controlled variable for differently modifying the rate of change in one direction of said signal-level applied to said electrical means with respect to the rate of change in the opposite direction of said signal-level applied to said electrical means to vary the relative time said element remains in one or the other of its said positions, a reset capacitor and a reset resistor included in said input circuit for modifying the electrical signal applied to said electrical means as a function of the time integral of departure of said controlled variable from said control point, and means for changing the charge upon said reset capacitor when said final control element is maintained in one of its said fixed positions for a time interval exceeding a predetermined length.

17. A control system having a final control element movable from one of two fixed positions to the other for varying the magnitude of a controlled variable, electrical means operable upon application thereto of a signal of one level for actuating said final control element to one of its said positions and operable upon application thereto of a signal of a different level for moving said final control element to the other of its said positions, signal-storing means, means including a source of supply and electrical resistors forming with said signal-storing means an input circuit for said electrical means for applying thereto a signal of amplitude related to the signal-level acquired by said storing means, means operable with said final element in one position for completing a charging circuit for said storing means to change the signal-level thereof in one direction and in its other position for completing a discharging circuit for changing said signal-level in the opposite direction, means responsive to change in said controlled variable for differently modifying the rate of change in one direction of signal-level applied to said electrical means with respect to the rate of change in the opposite direction of said signal-level applied to said electrical means to vary the relative time said element remains in one or the other of its said positions, a reset capacitor and a reset resistor included in said input circuit for modifying the electrical signal applied to said electrical means as a function of the time integral of departure of said controlled variable from said control point, and means for bringing said charge on said reset capacitor to a predetermined value when said final control element remains in one of its two fixed positions for a period exceeding a predetermined time interval.

18. A control system including a final control element movable from one of two fixed positions to the other for changing a controlled variable, actuating means for said element, a control network for said actuating means comprising a capacitor and a resistor, means including a circuit-changer for applying a voltage of one magnitude and then a voltage of a different magnitude to said capacitor through a circuit including said resistor, said actuating means being operable upon predetermined changes in the potential across said capacitor for moving said control element from one to the other of its positions, said network including a reset capacitor modifying the operation of said actuating means in accordance with the time integral of departure of said controlled variable from a control point, means for operating said circuit-changer with each operation of said actuating means for changing the magnitude of the voltage applied to said resistor and to said capacitor, means for developing in said control network a potential of magnitude related to the extent of departure of said controlled variable from said control point and of polarity dependent upon the direction of said departure for modifying the charging time relative to the discharging time of said first capacitor, and means including a charge-modifying circuit for said reset capacitor and a relay for closing said last-named circuit when said final control element remains in one of its said positions for a period exceeding a predetermined time interval for modifying the cyclic operation of said final control element as said controlled variable approaches said control point.

19. A control system comprising a final control element movable from one of two fixed positions to the other for varying the magnitude of a controlled variable, circuit means operable when said variable has a predetermined value relative to its value at a control point for operating said control element periodically from one of its said positions to the other, said circuit means including a reset energy storing device for varying the average time said element remains in one of its positions in accordance with the time integral of departure of said controlled variable from said control point, and control means operable in response to the maintenance of said element in said one position only for a predetermined time interval for initiating through said circuit means periodic operation as the value of said variable changes in a direction toward the control point and when it arrives at a value nearer said control point than the value which maintains said control element in one of its positions.

20. The combination set forth in claim 19 in which said energy storing device is a reset capacitor, and means including a source of voltage operable with operation of said control element for varying the energy level acquired by said capacitor in accordance with the time-average said element remains in one of its fixed positions relative to the other and in which said control means operates to complete an electrical circuit to said reset capacitor for bringing the charge thereof to a predetermined level.

21. The combination set forth in claim 19 in which said reset energy storing device is of the thermal type having a heating element regulating the heat input thereto in accordance with operation of said final control element and in which said control means operates to reduce the heat input to said energy storing device to limit the temperature rise thereof.

References Cited in the file of this patent

UNITED STATES PATENTS

| | | |
|---|---|---|
| 2,312,711 | Harrison | Mar. 2, 1943 |
| 2,325,232 | Davis | July 27, 1943 |
| 2,416,257 | Isserstedt | Feb. 18, 1947 |
| 2,617,089 | Davis | Nov. 4, 1952 |

U. S. DEPARTMENT OF COMMERCE
PATENT OFFICE

CERTIFICATE OF CORRECTION

Patent No. 2,823,861      Elwood T. Davis      February 18, 1958

It is hereby certified that error appears in the printed specification of the above numbered patent requiring correction and that the said Letters Patent should read as corrected below.

Column 1, line 40, for "In by" read -- In my --; column 2, line 62, for "of voltage" read -- or voltage --; column 4, line 50, for "polariy" read -- polarity --; column 13, line 55, for "componentts" read -- components --; line 67, for "contact 367" read -- contact 361 --; column 14, line 62, for "shaft" read -- shift --; column 17, line 22, for "circut" read -- circuit --.

Signed and sealed this 3rd day of June 1958.

(SEAL)
Attest:
KARL H. AXLINE
Attesting Officer

ROBERT C. WATSON
Commissioner of Patents